Patented May 27, 1952

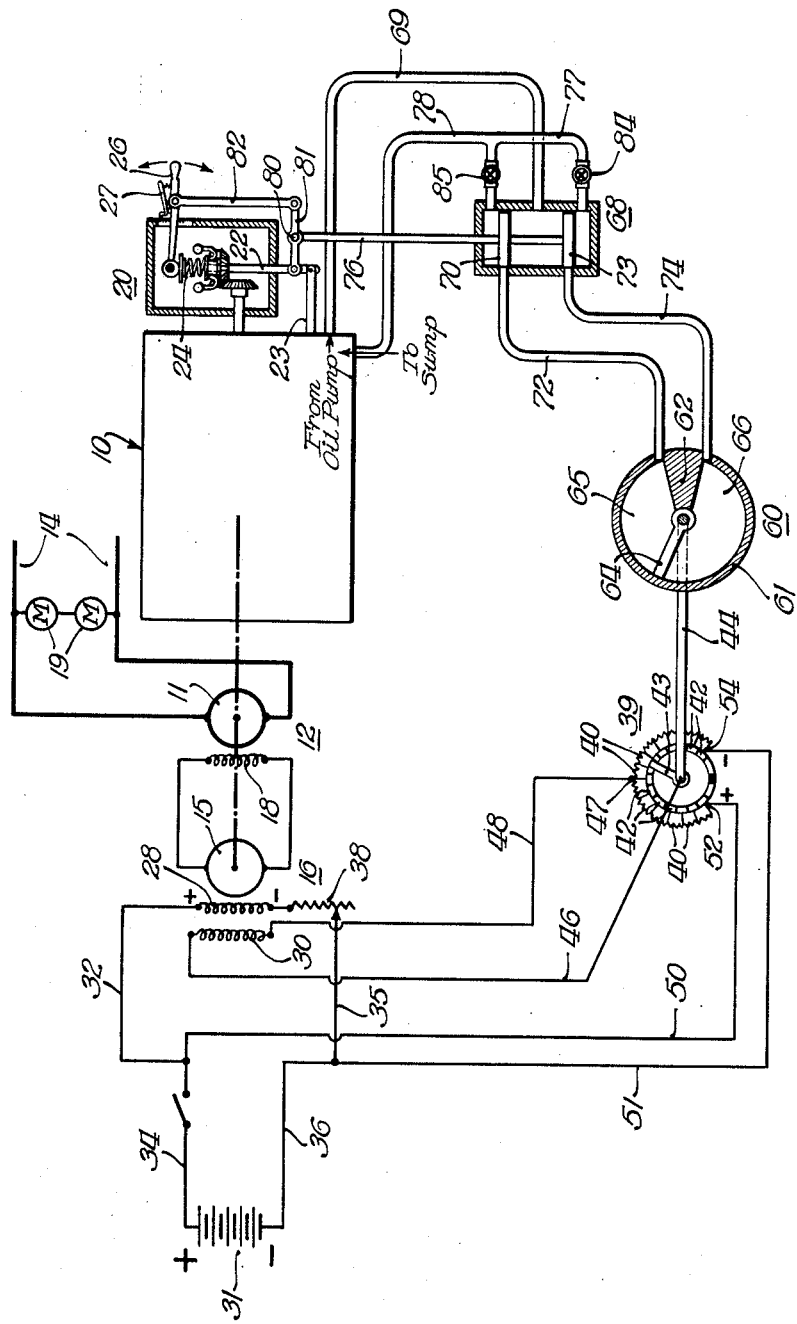

2,598,124

UNITED STATES PATENT OFFICE 2,598,124

POWER PLANT REGULATION

Gunnard T. Holt and John K. Stotz, Beloit, Wis., assignors to Fairbanks, Morse & Co., Chicago, Ill., a corporation of Illinois Application December 28, 1949, Serial No. 135,508

11 Claims. (Cl. 290—40)

This invention relates to improvements in power output regulation of power plants, and is concerned more particularly, with improved regulation of engine driven generator power plants for electrically driven railway vehicles such as locomotives, wherein the power plant is subject to wide variations in power demand.

Power plants of this character require for high operating efficiency, relatively rapid and close control of generator output effected through regulating means responsive quickly to changes in speed and loading of the engine. In conventional control systems for this purpose, the regulating means usually includes an engine speed responsive governor serving to regulate engine fuel supply and to effect operation of means for controlling the generator output such as to adjust the generator load on the engine for maintaining substantially constant speed operation of the engine at a selected speed. In such system, engine speed selection is effected usually through a provision under manual control, serving to determine speed setting of the governor through adjustment of the governor loading spring.

Generator output regulating provisions as heretofore employed in control systems of the character above mentioned, have not been altogether satisfactory, particularly in respect to adequate and rapid response to changes in prime mover speed and loading. In instances where the regulating provision acts directly on the main field of the generator, as through a variable resistance in series in the main field circuit, the control resistance necessarily must be of a heavy duty character, since it is subject to relatively high field currents. Among the disadvantages of such form of control therefore, are the requirement of expensive resistance devices and allied control equipment, and an inadequately sensitive control of generator output.

In other instances where the generator output control is produced through regulation of an exciter generator supplying field current to the generator field, the exciter usually incorporates a differential field winding energized by the current in the main generator output circuit. A differential field of adequate capacity to carry the main generator load currents, is difficult of application to an exciter field structure, and contributes to a more expensive exciter unit.

It is the general purpose of the present invention therefore, to provide a highly effective and sensitive power plant control system avoiding the above mentioned disadvantages among others, principally by control of generator output through an improved and greatly simplified form of exciter regulation. The control system as herein provided, embodies an exciter generator having separately excited field windings energized from a D. C. source of relatively small current capacity, wherein one winding is energized at an adjusted constant potential, while the other winding is controlled as to its excitation, by a variable resistance of a dual range character. The circuit relationship of the variable resistance and the last mentioned field winding of the exciter generator, is such that the resistance is effective in one control range thereof, to determine and regulate excitation of the winding differentially with respect to the constant potential winding, and in its other control range to determine and regulate excitation of the winding in aid of or cumulatively with respect to the constant potential winding. Moreover, operation of the resistance in either of its control ranges or from one range to the other, is effected automatically through a servo-motor responsive both to governor speed setting adjustments and to governor operation in response to engine speed and load changes. The ultimate purpose of the presently improved control system as such will appear hereinafter, is to afford a relatively simple yet highly effective and sensitive system embodying an exciter generator, for maintaining the main generator output loading of the engine at a constant value for a given speed setting of the engine as the latter is determined by speed setting adjustment of the engine governor.

The presently improved control system as above outlined, is illustrated in the single diagrammatic figure of the accompanying drawing, reference to which is made in the following description.

The power plant shown diagrammatically, includes a suitable prime mover 10 which for the purpose of present example is an internal combustion engine of diesel type. The engine 10 drives the armature 11 of the main generator 12 supplying power to the output circuit 14, and is in driving connection with the armature 15 of an auxiliary or exciter generator 16 providing the source of excitation current for the main generator field 18. In application of the power plant to a railway locomotive, the generator output circuit 14 supplies power to the locomotive traction motors, as the motors indicated at 19.

Operatively associated with the engine 10 is a governor 20 which may be of any suitable, well known construction, responsive to engine speed for regulating the fuel supply to the engine in accordance with engine speed and loading, the governor being illustrated somewhat diagrammatically only, since the exact structure thereof is not a part of the present invention. Fuel regulation may be accomplished through the engine fuel injection pumps (not shown) in conventional manner, effected from the governor displacement member 22 through the link 23. Adjustment of the governor loading spring 24 for setting the speed of the engine at any desired value within the speed adjustment range of the engine, may be accomplished in usual manner, represented diagrammatically herein by a pivoted, manually operated lever 26 operating a cam bearing against spring 24, the lever being releasably retained in speed setting position by a latch 27. The action of the governor in respect to generator output control will appear presently.

The exciter generator 16 is provided with field windings 28 and 30 separately excited from a suitable relatively low current capacity D. C. source such as the battery 31. Winding 28 is in circuit with the battery through leads 32 and 34 to the positive pole of the battery, and leads 35 and 36 to the opposite or negative battery pole. The lead 35 extends to an adjustable resistance 38 in series with winding 28, the resistance being provided for adjusting the excitation to a desired constant potential across the field 28.

Exciter field winding 30 constituting a differential-cumulative field relative to field 28 as will appear hereinafter, is energized preferably from the battery 31, under control of a dual range variable resistance or potentiometer 39. Resistance 39 comprises resistance elements 40 in series and connected to commutator-like contact bars 42 arranged circularly as shown, for engagement by a rotary contactor 43 fixed on an operating shaft 44. The exciter field 30 has one end thereof connected to the contactor 43 by a lead 46, and its other end connected to the midpoint 47 of the resistance through a lead 48. Conductors 50 and 51 connect the resistance in shunt to the battery 31, conductor 50 extending from resistance end terminal 52 to the positive pole lead 34, while the conductor 51 extends from the opposite end terminal 54 of the resistance to the negative pole lead 36.

The excitation circuit relationship of the field 30 and resistance 39 as above described, will appear to be such that when the resistance contactor 43 is actuated over the bars 42 connected to those of the resistance elements 40 between the midpoint 47 and the resistance end terminal 54, the field 30 will be variably excited differentially with respect to the field 28. Under this condition, the polarity of field 30 obviously is opposite to the polarity of field 28, so that the output of the exciter generator is more or less weakened depending on the position of the resistance contactor 43 in the range indicated. On the other hand, operation of the contactor over the bars 42 connected to the resistance elements between the mid-point 47 and the positive resistance terminal 52, produces an opposite effect. The field 30 then is variably excited to act cumulatively with the constant polarity, constant potential field 28, whereby to strengthen the exciter output variably in accordance with the position of the contactor 43 in the resistance range indicated.

Operation of the resistance unit 39 automatically under engine governor control, is accomplished preferably through a hydraulic servo-motor 60 shown diagrammatically as comprising a cylinder 61 divided by a partition 62 and a movable vane 64, into opposite pressure chambers 65 and 66. Movable vane 64 is fixed to shaft 44 of the resistance contactor 43, for actuation of the latter. Fluid pressure, preferably lubricating oil or governor oil under pressure from the engine oil pump (not shown), is admitted to the servo-motor through a double piston valve device 68, the space between the pistons receiving oil under pressure through a supply conduit 69. One piston 70 of the valve, controls fluid pressure delivery through conduit 72 to one chamber 65 of servo-motor 60, while the other piston 73, controls fluid pressure delivery through conduit 74 to the other servo-motor chamber 66. In the illustrated embodiment, upward displacement of the valve pistons from the neutral positions shown, opens the conduit 72 to admit oil pressure to servo-motor chamber 65 for displacing the vane counterclockwise as viewed in the drawing. Since the pistons are on a common operating rod 76 and hence move together, the lower piston then is positioned to open the servo-motor conduit 74 to an oil exhaust conduit 77 leading from the lower end of the valve 68 to a point of discharge which as here appears, may be the engine oil sump. The situation becomes reversed on downward displacement of the valve pistons, oil pressure then being admitted to servo-motor chamber 66 for clockwise displacement of vane 64, while the chamber 65 is exhausted through conduit 72, the upper end of the valve 68 and conduit 78 leading to the engine oil sump. The exhaust conduits 77 and 78 are provided with the control or metering valves 84 and 85 respectively, serving a purpose to appear.

The rod 76 of the valve pistons is pivoted at 80 to the midpoint of a floating lever 81, the lever in turn being pivotally connected at one end to the governor displacement member 22, and at its opposite end to a link 82 pivoted to the governor speed setting lever 26. Thus the valve 68 is under direct control of the governor and produces servo-motor operation in accordance with governor action as this will appear hereinafter.

Turning to the operation of the control system as diagrammatically illustrated and now described, it will be assumed that the engine 10 is running at a selected speed determined by the setting of the governor load spring through the setting lever 26 in the position shown and with the engine under load imposed by the generator supplying power to the traction motors 19 of the locomotive. It is assumed further, that at such time the parts of the control system are as shown, wherein the servo-motor vane is retained in the position of actuation illustrated, by the neutral position of the valve pistons closing the conduits 72 and 74, while the contactor 43 of the resistance located by the vane acting through shaft 44, is at an intermediate point in the resistance range between mid-point 47 and resistance terminal 54. The exciter field 30 then is energized in a direction to oppose the field 28, the two fields cooperating to determine the proper excitation of the generator field 18, such that the generator load on the engine balances substantially, the power output of the engine at the selected engine speed. Now, in the event the generator load on the engine increases, resulting in a decrease in engine speed, the governor responding to the latter causes the displacement member 22 thereof to move downwardly, thereby turning the floating lever 81 about the pivot on link 82 as a fulcrum, and at the same time acting through the link 23 in a direction tending to increase fuel delivery to the engine. Downward pivoting of the lever 81 lowers the valve pistons 70 and 73, conditioning the valve for oil pressure delivery through conduit 74 to servo-motor chamber 66, and exhaust from chamber 65 through conduit 72. The vane 64 thus is angularly displaced in the clockwise direction, moving the resistance contactor 43 toward the resistance terminal 54, thereby increasing the excitation of exciter field 30 in opposition to the excitation of field 28, and hence causing a decrease in output of the main generator. Concurrently with the foregoing action in respect to adjustment of the exciter output, the governor effects increased fuel delivery to the engine, tending to increase engine speed. As a consequence thereof and the decrease of generator output, the engine speed returns to the value determined by the setting of the lever 26, resulting in governor response to elevate member 22 and thereby return the floating lever 81 to a position effecting neutral positioning of the valve pistons to close the conduits 72 and 74. It is believed to be obvious now, that a drop in engine loading resulting in increased engine speed, causes the governor to operate the valve 68 such as to produce reverse displacement of the servo-motor vane 64, whereby to actuate the resistance in the direction to decrease excitation of the exciter field 30 counter to that of field 28. Depending upon the extent of load decrease, the resistance contactor 43 may be moved to the resistance mid-point 47 and therebeyond to the section of the resistance between the mid-point and terminal 52. In the event of the displacement to the latter extent, excitation of field 30 is reversed, becoming cumulative with respect to field 28. The net output of the exciter thus is increased to increase correspondingly, the output of the main generator whereby to restore the load on the engine to meet the normal power output of the engine at the selected speed.

With the control system conditioned as shown in the figure, a change in the speed setting of the engine through actuation of the setting lever 26 say in the upward or counter-clockwise direction, turning the cam in the direction to increase the loading effect of spring 24, produces initially, an upward movement of the floating lever 81 about its pivot to governor member 22. Through rod 76, the pistons 70 and 73 thus are displaced upwardly, opening conduit 72 for fluid pressure admission to servo-motor chamber 65 and opening conduit 74 to the exhaust line. The resulting counter-clockwise movement of vane 64 actuates the resistance contactor 43 in the direction to adjust the net exciter output for producing an increased generator output, and hence an increase in engine loading. Consequent to such speed setting change, the governor responds by downward movement of the member 22 which through the fuel control link 23, increases engine fuel feed. Downward movement of member 22 also effects a lowering of the valve pistons 70 and 73 until they close the conduits 72 and 74, when the output control system will be balanced at the altered engine speed. Reverse movement of the engine speed setting lever 26 will produce an effect opposite to the foregoing, as this will be now appreciated.

The operative connection including floating lever 81, between the governor and control valve 68 is here predetermined such that in all instances when the speed of the engine attains to the value selected according to the speed setting position of the lever 26, the valve pistons 70 and 73 will be in positions fully closing the conduits 72 and 74, thus constraining the servo-motor vane 64 to a fixed position. Moreover, the exciter 16 including the fields 28 and 30, and the resistance 39 including its operative connection with the servo-motor vane 64, are predetermined and proportioned such that in any given fixed position of the servo-motor attained as above indicated, the resultant regulated exciter output will determine the generator load on the engine at a value equal to the normal power output of the engine at the selected engine speed. Since the functioning of the elements of the present control system necessarily follows the action of the governor, the rate of servo-motor vane displacement is here adjusted through regulation of the metering valves 84 and 85. These valves regulate the rate of exhaust of fluid from the servo-motor such that in the action of the governor to operate the valve 68 to open either of the conduits 72 and 74 and thence close them, the vane 64 will be displaced in each instance just sufficiently to condition the control resistance 39 for determining exciter output at a value to determine the power output of the main generator such that the engine loading imposed thereby is in balance with the power output of the engine operating at the selected speed.

The control system now described and illustrated diagrammatically, affords a sensitive and close control of generator output in response to changes in engine speed and power output as reflected in the action of the engine governor, such that throughout engine-generator operation at any selected speed, the generator load on the engine substantially balances the normal engine power output at the selected speed. Contributing markedly to the functioning of the system as indicated, is the present improved manner of generator excitation control. Sensitive and close regulation of exciter output is here attained through resistance regulation of an exciter field acting in conjunction with a constant potential field, with the resistance-controlled field aiding or opposing the last mentioned field as determined automatically in response to engine governor operation. Regulation of exciter output through resistance control of a relatively low current exciter field winding as here provided, has the further important advantage of resistance control involving field currents materially less than the field currents through the main generator field, hence enabling the employment of the variable resistance having a current capacity substantially less than the capacity which would be required for a control resistance carrying main generator field currents. Moreover, the system as herein described and illustrated, facilitates simplification of exciter design with the attendant advantages, and enables regulation of locomotive power plant operation such that maximum generator output may be obtained at engine speeds less than full speed. Other advantages of the present control system are now believed to be apparent.

Having illustrated and described one embodiment of the invention, what we desire to claim and secure by Letters Patent of the United States is:

1. Generator output regulating means for an engine-driven generator supplying power to a load circuit, comprising an exciter driven by the engine and supplying excitation current to the generator, the exciter having only two field windings, one thereof separately energized at a predetermined constant potential, and an energizing circuit for the other winding including a control resistance, effective to determine and vary the energization of the last said winding selectively differentially and cumulatively with respect to the first said field winding.

2. Generator output regulating means for an engine-driven generator supplying power to a load circuit, comprising an exciter driven by the engine and supplying excitation current to the generator, the exciter having a field winding separately energized at a predetermined constant potential, a second exciter field winding, and an energizing circuit for said second winding including a source of direct current and a control resistance, effective to determine variable excitation of said second winding selectively differentially and cumulatively with respect to the first said exciter field winding.

3. A generator output regulating means for an engine-driven generator supplying power to a load circuit, comprising a generator field exciter driven by the engine and providing a field winding separately energized at a predetermined constant potential, a second exciter field winding, an energizing circuit for said second winding, and a dual range resistance in control of said energizing circuit, effective in one range thereof to determine and vary energization of the second exciter field winding differentially with respect to the first said exciter field winding, and in the other range thereof to determine and vary energization of the second exciter field winding cumulatively with respect to the first said exciter field winding.

4. Generator output regulating means for an engine-driven generator supplying power to a load circuit, comprising a generator field exciter driven by the engine and providing first and second exciter field windings, means providing a constant potential direct current source, a circuit connecting said first exciter field winding to said source for energization of the winding at a predetermined constant potential, and circuit means including a dual range control resistance, connecting said second exciter field winding to said source, wherein said control resistance is effective in one range thereof to determine and vary energization of said second exciter field winding differentially with respect to said first field winding, and in the other control range thereof to determine and vary energization of said second exciter field winding cumulatively with respect to said first field winding.

5. In combination with a prime mover and a generator driven thereby the generator having a field winding and supplying power to a load circuit, an exciter driven by the prime mover and having an armature winding in circuit with the generator field winding, said exciter having only two field windings, one thereof separately energized at a predetermined constant potential, an energizing circuit for the other field winding including a variable resistance, effective for determining and varying the excitation of the last said winding selectively differentially and cumulatively with respect to the first said field winding, and means operable responsively to variations in prime mover speed, for actuating said variable resistance.

6. In combination with a prime mover and a generator driven thereby, the generator having a field winding and supplying power to a load circuit, an exciter driven by the prime mover and having an armature winding in circuit with the generator field winding, said exciter having a separately excited field winding energized at a predetermined constant potential, and a second field winding, an energizing circuit for the second field winding including a source of direct current and a variable resistance, adapted for determining and varying excitation of the second winding selectively differentially and cumulatively with respect to the first said exciter field winding, and means operable responsively to variations in prime mover speed, for actuating said variable resistance.

7. In combination with a prime mover and a generator driven thereby, the generator having a field winding and supplying power to a load circuit, an exciter driven by the prime mover and having an armature winding in circuit with the generator field winding, said exciter having only two field windings, means providing a direct current source, a circuit connecting one of said exciter field windings to said source for excitation of the winding at a predetermined constant potential, circuit means including a variable resistance, connecting the other of the exciter field windings to said source and effective through the resistance, for determining and varying excitation of the winding selectively differentially and cumulatively with respect to the first said exciter field winding, and means operable responsively to variations in prime mover speed, for actuating said variable resistance.

8. In combination with a generator supplying power to a load circuit, and an internal combustion engine driving the generator and having a speed setting and speed controlling governor, a generator output regulating system including an exciter driven by the engine and supplying excitation current to the generator, said exciter having two field windings, one thereof separately excited at a predetermined constant potential, an energizing circuit for the other field winding including a dual range variable resistance effective in one range to determine and vary excitation of the winding differentially with respect to the first said field winding, and in the other range to determine and vary excitation of the winding cumulatively with respect to the first said field winding, and fluid-pressure operated means responsive to operation of the engine governor, for actuating said variable resistance.

9. A generator output regulating system for an engine-driven generator supplying a load circuit, comprising an exciter for energizing the generator field, means providing a direct current source, said exciter having only two field windings, one thereof energized from said source with the polarity of the winding constant, a variable resistance device providing a resistance element in shunt circuit with said source and having a movable contactor, and the other of said exciter field windings being connected to said contactor and to an intermediate point of the resistance element, whereby operation of said contactor relative to the portion of the resistance element on one side of said intermediate point thereof, determines and varies excitation of the last said winding in opposition to the first said winding, while operation of the contactor relative to the resistance portion on the opposite side of said intermediate point thereof, determines and varies excitation of said other winding in aid of the first said winding.

10. In combination with a generator supplying a load circuit, and an internal combustion engine driving the generator and having a speed setting and speed controlling governor, generator output regulating means comprising an exciter for the generator, means providing a constant potential direct current source, said exciter having only two field windings, one thereof energized from said source with the polarity of the winding constant, a variable resistance device providing a resistance element in shunt circuit with said source and having a movable contactor, the other of said field windings being connected to said contactor and to an intermediate point of the resistance element, whereby operation of the contactor relative to the resistance on one side of said intermediate point thereof, determines and varies excitation of the winding in opposition to the first said winding, while operation of the contactor relative to the resistance on the opposite side of the intermediate point thereof, determines and varies excitation of the winding in aid of the first said winding, and fluid-pressure operated means responsive to operation of the engine governor, for operating said contactor.

11. An output regulator mechanism for an engine generator power plant, comprising speed and output regulating means for the engine, output controlling means for the generator to regulate the load to the engine, said controlling means including a constant potential direct current source, an exciter having only two field windings one thereof energized from said source at a predetermined constant potential, and control means in circuit with said source and the other of said field windings, operable to determine and vary the excitation of the field winding selectively differentially and cumulatively with respect to the first said field winding, power means adapted for operating said control means, a control device for said power means including a movable control member for controlling the application of power to said power means, governor means responsive to variations in engine speed for actuating said engine regulating means and for moving said control member, and means for modifying the response of said governor means.

GUNNARD T. HOLT.
JOHN K. STOTZ.

REFERENCES CITED

The following references are of record in the file of this patent:

UNITED STATES PATENTS

| Number | Name | Date |
| --- | --- | --- |
| 1,975,624 | Simmen | Oct. 2, 1934 |
| 1,977,407 | Schaer | Oct. 16, 1934 |
| 1,994,121 | Collingham | Mar. 12, 1935 |
| 2,060,900 | Simmen | Nov. 17, 1936 |
| 2,310,876 | Smith | Feb. 9, 1945 |
| 2,397,152 | Montgomery et al. | Mar. 26, 1946 |
| 2,433,628 | Schlapfer | Dec. 30, 1947 |
| 2,437,483 | Schlapfer | Mar. 9, 1948 |
| 2,439,325 | Wiesendanger | Apr. 6, 1948 |